United States Patent [19]

Natarajan

[11] Patent Number: 5,699,355
[45] Date of Patent: Dec. 16, 1997

[54] SYSTEM AND METHODS FOR INTEGRATED SHARING OF SATELLITE ACCESS LINK BANDWIDTH

[75] Inventor: Kadathur S. Natarajan, Schaumburg, Ill.

[73] Assignee: Motorola, Inc., Schaumburg, Ill.

[21] Appl. No.: 551,969

[22] Filed: Nov. 2, 1995

[51] Int. Cl.$^6$ .......................... H04B 7/185; H04B 7/212
[52] U.S. Cl. .......................... 370/322; 370/348; 370/443; 370/458
[58] Field of Search .......................... 370/95.3, 95.1, 370/85.7, 94.1, 110.1, 322, 337, 336, 329, 348, 443, 442, 458; 342/352; 455/12.1

[56] References Cited

U.S. PATENT DOCUMENTS 5,197,125 3/1993 Engel et al. .......................... 395/200
5,555,266 9/1996 Buchholz et al. .......................... 370/95.1

*Primary Examiner*—Douglas W. Olms
*Assistant Examiner*—Matthew C. Phillips
*Attorney, Agent, or Firm*—Harold C. McGurk, IV

[57] ABSTRACT

System (10) and methods (100) assign satellite link access bandwidth upon demand as requested by a number of subscriber units (30). After receiving the connection request, a number of time slots being requested is determined. Next, if the maximum number of available time slots is greater than or equal to the number of time slots being requested plus the number of time slots already in use, the connection request is accepted and the number of requested time slots are allocated before communication begins. Otherwise the connection request is rejected and the subscriber unit (30) must try later.

15 Claims, 2 Drawing Sheets

SYSTEM AND METHODS FOR INTEGRATED SHARING OF SATELLITE ACCESS LINK BANDWIDTH

TECHNICAL FIELD

This invention relates generally to space-based mobile telecommunication systems and, in particular, to a system and methods for assigning satellite link access bandwidth upon demand from requesting users.

BACKGROUND OF THE INVENTION

In a space-based telecommunication system, a user station gains access to a satellite that can provide adequate radio coverage. In a multi-user, bandwidth-on-demand telecommunication system, the satellite link access bandwidth is a precious resource that must be used efficiently and shared equitably by all competing users. Accordingly, there is a significant need for a method that enables satellite link access bandwidth to be efficiently shared among a competing set of applications with diverse or similar bandwidth requirements.

DESCRIPTION OF THE PREFERRED EMBODIMENTS

The present invention has utility in that a system and methods provide a way for allocating resources in a demand-assigned TDMA system. A "satellite" as used throughout this description means a manmade object or vehicle intended to orbit the earth. A "satellite" comprises geostationary, low-earth and medium-earth orbiting satellites and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential. The terms "cell", "beam" and "antenna pattern" are not intended to be limited to any particular mode of generation and include those created by either terrestrial or space-based telecommunication systems and/or combinations thereof.

Figure 1:
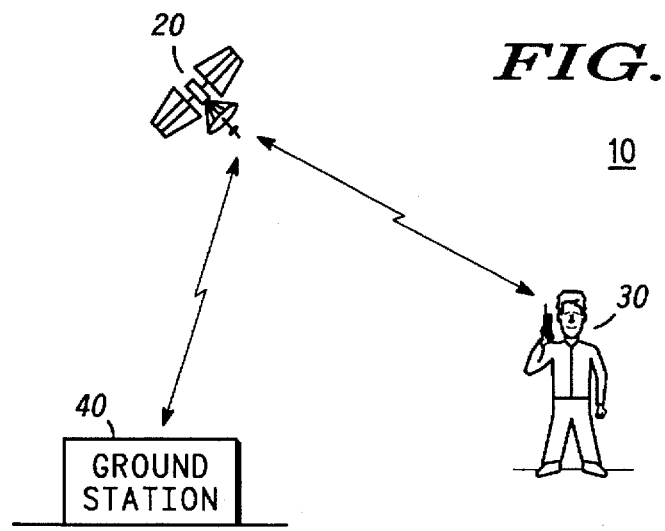
FIG. 1 shows a general view of a space-based mobile telecommunication system according to a preferred embodiment of the present invention.

FIG. 1 shows a general view of space-based telecommunication system 10 according to a preferred embodiment of the present invention. Although FIG. 1 illustrates a highly simplified diagram of mobile telecommunication system 10, system 10 comprises at least one satellite 20, any number of subscriber units 30 and at least one ground station 40. Generally, telecommunication system 10 may be viewed as a network of nodes. All nodes of communication system 10 are or may be in data communication with other nodes of communication system 10 through communication links. In addition, all nodes of telecommunication system 10 are or may be in data communication with other telephonic devices dispersed throughout the world through public service telephone networks (PSTNs) and/or conventional terrestrial communication devices coupled to a PSTN through conventional terrestrial base stations.

The present invention is applicable to space-based telecommunication systems that assign particular regions on the earth to specific cells on the earth, and preferably to systems that move cells across the surface of the earth. Although the present invention is applicable to space-based telecommunication systems 10 having at least one satellite 20 in low-earth, medium-earth or geosynchronous orbit, satellite 20 is preferably in low-earth orbit around earth. Satellite 20 may be a single satellite or one of many satellites in a constellation of satellites orbiting earth. The present invention is also applicable to space-based telecommunication systems 10 having satellites 20 which orbit earth at any angle of inclination including polar, equatorial, inclined or other orbital patterns. The present invention is applicable to systems 10 where full coverage of the earth is not achieved (i.e., where there are "holes" in the telecommunication coverage provided by the constellation) and to systems 10 where plural coverage of portions of the earth occur (i.e., more than one satellite is in view of a particular point on the earth's surface).

Each satellite 20 communicates with other nearby satellites 20 through cross-links. These cross-links form a backbone of space-based mobile telecommunication system 10. Thus, a call or communication from one subscriber unit located at any point on or near the surface of the earth may be routed through a satellite or a constellation of satellites to within range of substantially any other point on the surface of the earth. A communication may be routed down to a subscriber unit (which is receiving the call) on or near the surface of the earth from another satellite 20. How satellite 20 physically communicates (e.g., spread spectrum technology) with subscriber units 30 and ground station 40 is well known to those of ordinary skill in the art.

Subscriber units 30 may be located anywhere on the surface of earth or in the atmosphere above earth. Mobile telecommunication system 10 may accommodate any number of subscriber units 30. Subscriber units 30 are preferably communication devices capable of receiving voice and/or data from satellites 20 and/or ground station 40. By way of example, subscriber units 30 may be hand-held, mobile satellite cellular telephones adapted to transmit to and receive transmissions from satellites 20 and/or ground station 40. Moreover, subscriber units 30 may be computers capable of sending email messages, video transmitters or facsimile machines just to name a few.

How subscriber units 30 physically transmit voice and/or data to and receive voice and/or data from satellites 20 is well known to those of ordinary skill in the art. In the preferred embodiment of the present invention, subscriber units 30 communicate with satellite 20 using a limited portion of the electromagnetic spectrum that is divided into numerous channels. The channels are preferably combinations of L-Band, K-Band and/or S-band frequency channels but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Ground station 40 communicates with and controls satellite 20. There may be multiple ground stations 40 located at different regions on the earth. For example, there may be one ground station 40 located in Honolulu, another located in Los Angeles and another in Washington, D.C. Another example is to have separate ground stations 40 located in each country on the earth. Ground station 40 may provide satellite control commands to satellite 20 so that satellite 20 maintains its proper position in its orbit and performs other essential house-keeping tasks. Ground station 40 may be additionally responsible for receiving voice and/or data from satellite 20. How ground station 40 physically communicates (e.g., spread spectrum) with satellites 20 and/or subscriber units 30 is well known to those of ordinary skill in the art.

Figure 2:
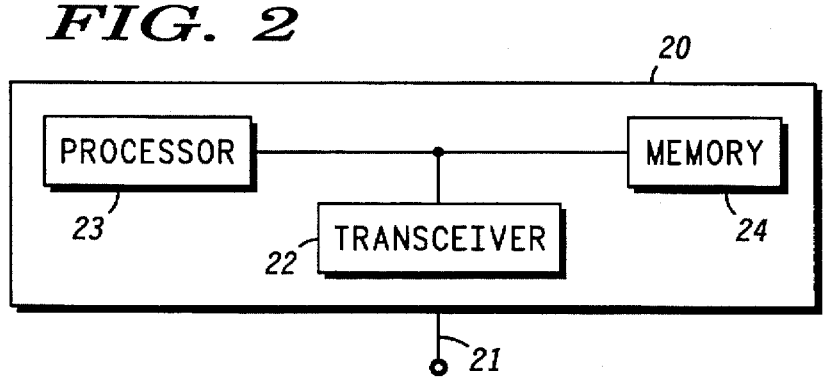
FIG. 2 shows a general view of the components of a satellite and/or ground station according to preferred embodiment of the present invention.

FIG. 2 shows a general view of the components of satellite 20 and/or ground station 40 according to a preferred embodiment of the present invention. For purposes of this description, reference will be made to satellite 20, although most of the components are similar to those in ground station 40. Satellite 20 comprises at least the following components: antenna 21, transceiver 22, processor 23 and memory 24. There may be other components of satellite 20 that are not shown which are necessary for operating a satellite but are not important to the present invention. These other components are well known to those of ordinary skill in the art, including for example, solar arrays and fuel propulsion system in satellites 20, or security systems and network routers in ground stations 40. Moreover, there may be more than one of the components in satellite 20, such as multiple processors 23, for example.

Antenna 21 of satellite 20 is coupled to transceiver 22, while transceiver 22, processor 23 and memory 24 are inter-coupled to each other. Transceiver 22 is able to transmit or receive data or voice, and may be for example, a modem. Transceiver 22 is also capable of receiving data from subscriber units 30 and/or ground station 40. Processor 23, via a software program (e.g., method 100 described below), controls the operation of satellite 20 and the other components of satellite 20. Memory 24 stores the software executable version of method 100 (described below) and other software programs. Antenna 21, transceiver 22, processor 23 and memory 24 are all well known to those of ordinary skill in the art.

Figure 3:
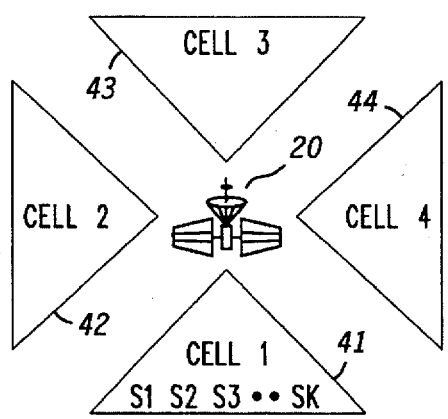
FIG. 3 shows a satellite having multiple cells that service a number of subscriber units according to a preferred embodiment of the present invention.

FIG. 3 shows satellite 20 having cells 41–44 serving subscriber units ($S_1$ . . . $S_k$) according to a preferred embodiment of the present invention. As shown in FIG. 3, satellite 20 has at least four cells 41–44. Satellite 20 communicates with subscriber units ($S_1, S_2, S_3, \ldots S_k$) through cell 41. Each of the cells broadcasts to the subscriber units using an assigned frequency that does not interfere with the frequency transmitted by an adjacent cell.

Assume that a given amount of spectrum (F) is divided into a limited number (n) of sub-bands ($F_n$) by using Frequency Division Multiplexing techniques. The sum total of the number of each of the sub-bands ($F_n$) equals the amount of available spectrum (F); thus $F=F_1+F_2+F_3+ \ldots +F_n$. Each of the sub-bands ($F_n$) may be assigned to a corresponding cell. For example, suppose spectrum (F) was divided into four sub-bands, one sub-band or frequency for each of the cells shown in FIG. 3. Frequency $F_1$ may be assigned to cell 41, frequency $F_2$ may be assigned to cell 42, frequency $F_3$ may be assigned to cell 43 and frequency $F_4$ may be assigned to cell 44. How a sub-band ($F_n$) is assigned to a cell is unimportant to the present invention. Thus, the total spectrum (F) available to satellite 20 shown in FIG. 3 is equal to $F_1+F_2+F_3+F_4$. If satellite 20 in FIG. 3 had more cells, the amount of spectrum (F) may not change. However, the number (n) of sub-bands ($F_n$) and the allocation of the sub-band to a cell may change.

Each sub-band ($F_n$) provides a digital channel with a fixed capacity ($C_n$). The sub-band ($F_n$) is divided into a limited number of channels by using Time Division Multiplexing techniques. The total satellite channel capacity is C where $C=C_1+C_2+C_3+ \ldots +C_n$. In a satellite with multiple beams, such as shown in FIG. 3, each cell has a number of digital channels having channel capacity $C_i$. In such a multibeam satellite system, the method described below is used for allocating bandwidth among users within each cell. The process by which subscriber units are assigned to cells is decided separately prior to application of the method described below and is well known to those of skill in the art. One new method is described in U.S. Ser. No. 08/502,793 to Natarajan et al. and is entitled "Centralized Dynamic Channel Assignment Controller and Methods", incorporated by reference herein.

To illustrate channel access, suppose time is divided into a sequence of frames that have a fixed duration (FD). Further suppose the capacity (C) of a channel is equal to 51.8 Mbps and the frame duration FD=0.01 seconds (or 10 milliseconds). Next assume that all packets have a fixed size equal to 53 bytes and the packet length (PL) is equal to 424 bits/slot (i.e., packet size of 53 bytes multiplied by 8 bits per byte). Thus, the channel will enable a maximum of 1221 packets per frame to be transported according to the equation of C (51.8 Mbps) multiplied by FD (0.01 seconds) divided by PL (424 bits/packet). In this description, slot and packet is interchangeable. The maximum number of packets transported per frame is based on a number of factors, including the channel speed, packet size, frame duration, guard intervals between packets, overhead for synchronization, for example. Each frame allows NP packets to be shared per frame among multiple users on the ground.

A subset of a frame is set aside for making requests for bandwidth. Use of the request channel (in uplink direction) is accomplished according to a deterministic or random access protocol such as Slotted-ALOHA or some other conventional protocol known to those of ordinary skill in the art.

Figure 4:
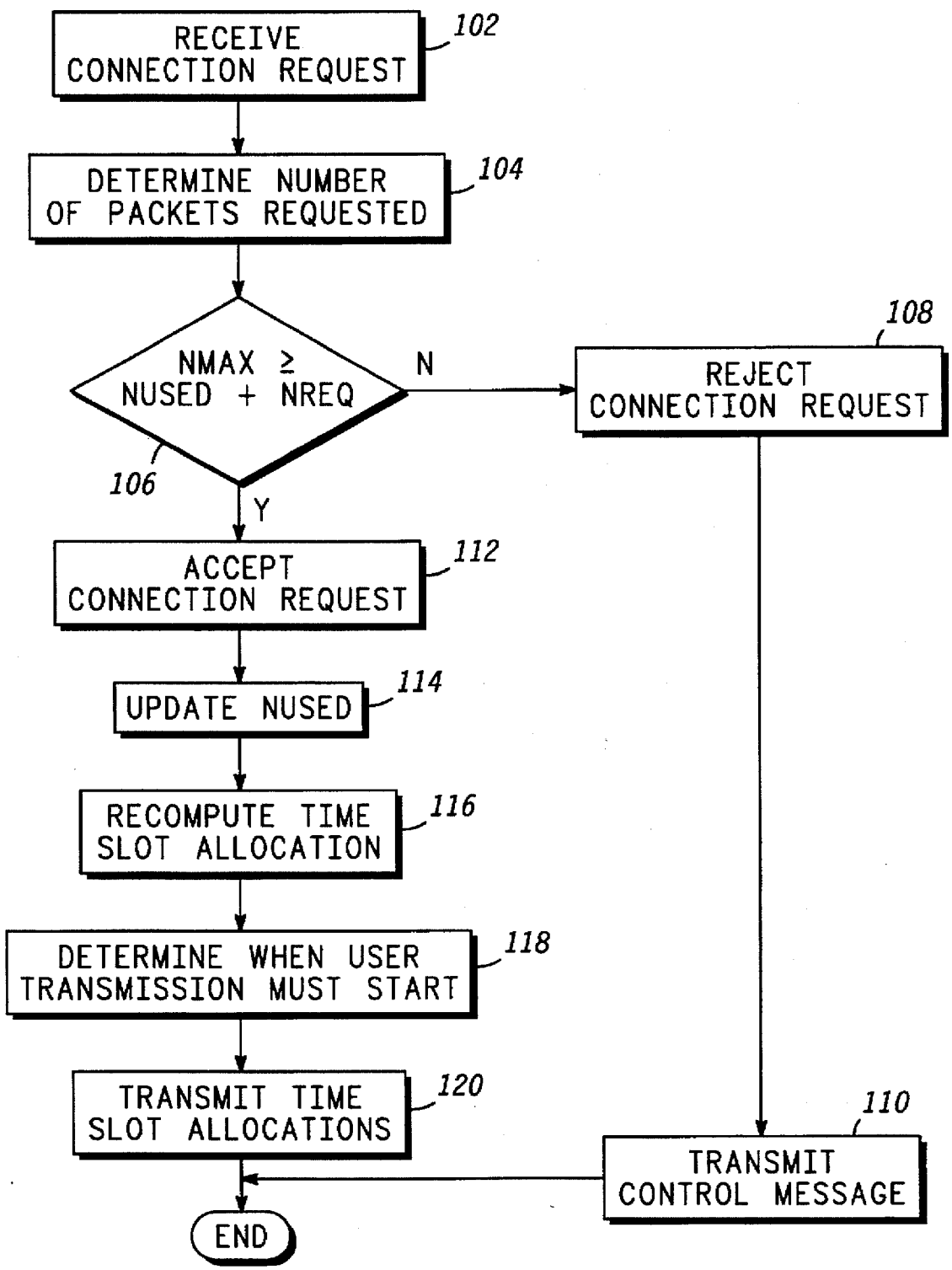
FIG. 4 shows a method for allocating time slots of a channel to a subscriber unit according to a preferred embodiment of the present invention.

FIG. 4 shows method 100 for allocating time slots of a channel to a subscriber unit according to a preferred embodiment of the present invention. Method 100 is a software program that is executed by satellite 20 in the preferred embodiment, but could be executed by a terrestrial station, such as ground station 40. Satellite 20 executes other software programs, such as satellite control processes for keeping the satellite in its proper orbit.

Method 100 begins in step 102 by a satellite receiving a connection request from a subscriber unit. Included in the connection request is the identification of who the subscriber unit is trying to reach, the amount of bandwidth to be provisioned for the connection, and optionally, the time duration for which the connection is desired. The amount of bandwidth is provided as a constant bit rate connection of C bps.

As shown in FIG. 3, the satellite next determines in step 104 how many packets per frame are being requested by the subscriber unit. For example, suppose the subscriber unit requests a connection of 1.544 Mbps as contained within the connection request. The number of requested slots per frame is equal to 37 assuming that the FD=0.01 seconds (i.e., C*FD/PL or 1.544 Mbps multiplied by 0.01 seconds divided by 424 bits/slot=37 slots per frame).

In step 106, the satellite determines whether the number of requested slots per frame ("NREQ") plus the number of slots per frame that are already allocated when the request from the subscriber unit is received ("NUSED") is greater than or equal to the maximum number of available slots per frame ("NMAX"). NREQ is determined in step 104 as described above. NUSED is initially zero, but is updated every time the satellite accepts a connection request as described below in step 114. NMAX represents the maximum number of available slots per frame that the satellite can allocate. This test is based on availability of the bandwidth and represents a necessary condition for accepting the connection request.

As shown in FIG. 4, if NMAX is less than (NUSED+ NKEQ), then the satellite rejects in step 108 the connection request and transmits in step 110 a control message to the subscriber unit via the downlink channel that lets the subscriber unit know that the connection request is denied. If the connection request is rejected by the satellite, the subscriber unit can either wait a random amount of time and try later, or the subscriber unit can try to make a connection request to another cell of the same or another satellite.

If NMAX is greater than or equal to (NUSED+NKEQ), then in step 112, the satellite accepts the connection request. In alternative embodiments, additional factors such as priority of the connection request and willingness to pay for the connection, for example, can be used to augment the acceptance criteria for the connection request. For example, suppose more than one connection request was received by the satellite. However, there was not enough bandwidth to handle all of the requests. Under one scenario, the satellite chooses to service one of the connection requests that is paying more money for the call. Under another scenario, the satellite chooses to service the connection request having a higher calling priority. Such more elaborate tests can be handled within the framework outlined here.

The satellite updates in step 114 NUSED to be the sum of NUSED and NREQ. The updated NUSED will be used by the satellite the next time it executes step 106 (i.e., is NMAX greater than or equal to NUSED plus NREQ). Next in step 116, the satellite determines which time slots in the frame are to be allocated to the subscriber unit. The time slots assigned when a connection request is accepted do not have to be contiguous. However, in an alternative embodiment, the time slots could be contiguous. Thus, the satellite would have to recompute slot positions for connections that may be ongoing at the time of granting the new request. There are commercially available slot scheduling algorithms for determining and assigning time slots.

After determining the slot positions for the subscriber unit, and perhaps the ongoing user connections, the satellite determines in step 118 precisely when the transmission by the subscriber unit must start at the ground so that the packets are received by the satellite at the correct time slots. This will require knowing the physical location of the subscriber unit, the time-dependent position of the satellite as it moves in space, and the propagation delay from each subscriber unit to the satellite as a function of time. The satellite computes the precise times at which each subscriber unit must transmit its packets so that the packets are received at the correct time instants at the satellite. In an alternative embodiment, the subscriber unit computes transmission times based on its physical location, the time-dependent position of the satellite and the propagation delay.

Next in step 120 of method 100 of FIG. 4, the satellite transmits on the downlink the time slot allocations (e.g., beginning and end time slots) for the subscriber unit and the other subscriber units that have ongoing connections. Transmissions of time slot allocations can occur as control packets are sent on the downlink channel or as messages are being sent on the downlink control channel from the satellite to the subscriber units located on the ground. If the subscriber unit receives an acceptance message in response to its connection request, then the subscriber unit listens for more pertinent control information including time slot allocation and motion compensation information, for example. Thereafter, the subscriber unit will transmit data or information to the satellite according to the control information.

In the preferred embodiment, the subscriber units making the connection requests are of a constant bit rate type. Such connections are characterized in that a fixed number of slots are required to be guaranteed per frame during the entire lifetime of the connection. These connections are commonly referred to as Circuit Mode Transport. For example, if a $T_1$ connection is requesting a call having a 5 minute call duration, the satellite must allocate 37 slots per frame for a consecutive sequence of 30,000 frames (100 frames per second times 300 seconds and assuming FD=0.01 seconds).

For certain applications such as data traffic as well as non-realtime voice and video traffic, there is no requirement for guaranteeing a constant bit rate. These applications require a Packet Mode Transport and make bandwidth requests to the satellite on an as needed basis. For example, a subscriber unit performing a file transfer to a destination station may demand the satellite to grant link access bandwidth multiple times, once for each physical block of data transferred. These packet-based applications make bandwidth requests of a non-recurring type. The satellite scheduler will handle them within the framework outlined above. The accept or reject tests (steps 106 and 112) would be replaced in an alternative embodiment for modifications for packet mode transport.

For step 106, if NMAX<NUSED+NREQ, the satellite does not reject the connection request. Instead, the satellite satisfies as much of the connection request as possible. Suppose for example, $G_1$ slots can be granted to a subscriber unit out of the NREQ slots requested, where $G_1$<NREQ. The $G_1$ slots would be allocated to the subscriber unit and NREQ would be decremented by $G_1$ to reflect the fact that a backlog of NREQ-$G_1$ slots are still needed by the subscriber trait. The satellite must try to schedule in the next frame or at the earliest opportunity and clear the backlog. If $G_2$ slots are allocated in the next frame, the backlog is decreased further by $G_2$. The process repeats until the backlog becomes zero. Meanwhile a new request from the user station may arrive at the satellite. If this happens, the backlog will be increased by the size of the new request. The satellite's objective is to clear the backlog for all uses that request Packet Mode Transport in as short a time as possible subject to the prevailing load constraints on the satellite access link. After the satellite grants a specific number of slots to the subscriber unit, the remaining steps shown in FIG. 4 are essentially the same as described above.

It will be appreciated by those skilled in the art that the present invention enables satellite link access bandwidth to be efficiently shared among a competing set of applications with diverse or similar bandwidth requirements. The present invention saves resources, associated costs and gives user accessibility. For certain types of communication, including voice and video, the present invention guarantees a certain amount of bandwidth per call for a predetermined amount of time. The method and system accommodates bandwidth on demand for systems that are in a constant state of flux, such as a space-based telecommunication network, as well as for stationary environments.

Although the present invention applies to managing capacity and allocating resources within a cell, it is applicable in low-earth and medium-earth orbit satellite systems where resources are passed between cells of the same satellite and different satellites. Each cell has a distinct capacity. Whenever handoff occurs between cells of the same or different satellite, the present invention is applicable for determining whether the cell can handle the on-going call. The calls will be accepted or rejected/dropped based on the steps described above.

Accordingly, it is intended by the appended claims to cover all modifications of the invention which fall within the true spirit and scope of the invention.

What is claimed is:

1. A method for assigning satellite access link bandwidth upon demand, the method comprising the steps of:
   a) receiving a connection request;
   b) determining a requested number of time slots based on a requested capacity multiplied by a frame duration, divided by a packet length;
   c) accepting the connection request if a maximum number of time slots is greater than or equal to the requested number of time slots plus a number of used time slots;
   d) allocating the requested number of time slots; and
   e) transmitting time slot information so that communication can begin.

2. A method as recited in claim 1, wherein step (a) comprises the step of a satellite receiving the connection request from a subscriber unit.

3. A method as recited in claim 1, further comprising the step of rejecting the connection request if the maximum number of time slots is less than the requested number of time slots plus the number of used time slots.

4. A method as recited in claim 3, wherein a subscriber unit is making the connection request, and wherein the method further comprises the step of transmitting a control message to the subscriber unit if the connection request is rejected.

5. A method as recited in claim 1, wherein step (c) comprises the step of accepting the connection request based on whether the maximum number of time slots is greater than or equal to the requested number of time slots plus a number of used time slots and priority of the connection request.

6. A method as recited in claim 1, further comprising the step of updating the number of used time slots by the requested number of time slots.

7. A method as recited in claim 1, wherein a subscriber unit is making the connection request to a satellite, and wherein the method further comprises the step of determining when the subscriber unit should begin transmission with the satellite.

8. A method as recited in claim 1, wherein step (e) comprises the step of transmitting the time slot information over a control channel.

9. A method for assigning satellite access link bandwidth upon demand, the method comprising the steps of:
   a) receiving a connection request;
   b) a satellite determining a requested number of time slots based on a requested capacity multiplied by a frame duration, divided by a packet length;
   c) accepting the connection request if a maximum number of time slots is greater than or equal to the requested number of time slots plus a number of used time slots;
   d) allocating the requested number of time slots; and
   e) transmitting time slot information so that communication can begin.

10. A method for assigning satellite access link bandwidth upon demand, the method comprising the steps of:
    a) receiving a connection request;
    b) determining a requested number of time slots;
    c) accepting the connection request based on whether the maximum number of time slots is greater than or equal to the requested number of time slots plus a number of used time slots and willingness to pay for a connection;
    d) allocating the requested number of time slots; and
    e) transmitting time slot information so that communication can begin.

11. A method for assigning satellite access link bandwidth upon demand, the method comprising the steps of:
    a) receiving a connection request;
    b) determining a requested number of time slots;
    c) accepting the connection request if a maximum number of time slots is greater than or equal to the requested number of time slots plus a number of used time slots;
    d) allocating the requested number of time slots;
    e) transmitting time slot information so that communication can begin; and
    f) recomputing time slot allocations for calls in progress and for the connection request.

12. A method executed by a satellite for assigning satellite access link bandwidth upon demand, the method comprising the steps of:
    a) the satellite receiving a connection request;
    b) the satellite determining a requested number of time slots based on a requested capacity multiplied by a frame duration, divided by a packet length;
    c) the satellite accepting the connection request if a maximum number of time slots is greater than or equal to the requested number of time slots plus a number of used time slots;
    d) the satellite rejecting the connection request if the maximum number of time slots is less than the requested number of time slots plus the number of used time slots;
    e) the satellite allocating the requested number of time slots; and
    f) the satellite transmitting time slot information so that communication can begin.

13. A method executed by a ground station for assigning access link bandwidth upon demand, the method comprising the steps of:
    a) the ground station receiving a connection request;
    b) the ground station determining a requested number of time slots based on a requested capacity multiplied by a frame duration, divided by a packet length;
    c) the ground station accepting the connection request if a maximum number of time slots is greater than or equal to the requested number of time slots plus a number of used time slots;
    d) the ground station rejecting the connection request if the maximum number of time slots is less than the requested number of time slots plus the number of used time slots;
    e) the ground station allocating the requested number of time slots; and
    f) the ground station transmitting time slot information so that communication can begin.

14. A method for assigning satellite access link bandwidth upon demand, the method comprising the steps of:
   a) receiving a connection request;
   b) determining a requested number of time slots based on a requested capacity multiplied by a frame duration, divided by a packet length;
   c) allocating the requested number of time slots if the requested number of time slots plus a number of used time slots is less than or equal to a maximum number of available time slots;
   d) allocating a portion of the requested number of time slots if the requested number of time slots plus a number of used time slots is greater than a maximum number of available time slots;
   e) transmitting time slot information so that communication can begin; and
   f) repeating steps (d) and (e) until all the requested number of time slots is allocated.

15. A system comprising:
   a transceiver that is capable of receiving a connection request and transmitting time slot information; and
   a processor coupled to the receiver that is capable of determining a requested number of time slots based on a requested capacity, multiplied by a frame duration, divided by a packet length, accepting the connection request if a maximum number of time slots is greater than or equal to the requested number of time slots plus a number of used time slots, rejecting the connection request is the maximum number of time slots is less than the requested number of time slots plus the number of used time slots and allocating the requested number of time slots.

* * * * *